Feb. 20, 1934.                L. C. COLE                1,947,829
                              LATHE DRIVE
                          Filed Dec. 2, 1930
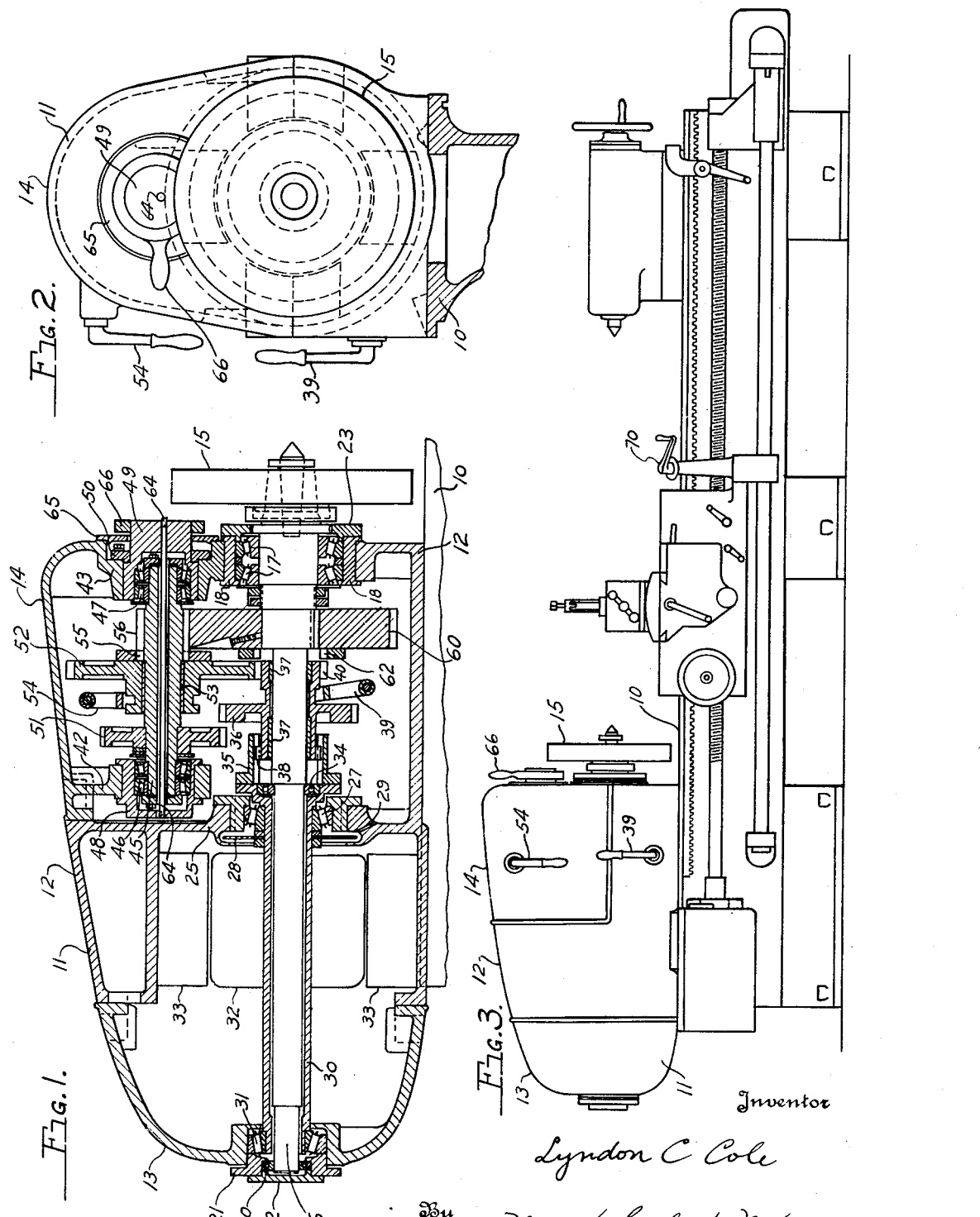
Inventor
Lyndon C Cole
By Maréchal & Noé
Attorneys Patented Feb. 20, 1934

1,947,829

UNITED STATES PATENT OFFICE 1,947,829

LATHE DRIVE

Lyndon C. Cole, Hamilton, Ohio, assignor to General Machinery Corporation, Hamilton, Ohio, a corporation of Delaware Application December 2, 1930. Serial No. 499,525

9 Claims. (Cl. 82—28)

This invention relates to lathes and more particularly to lathe headstocks.

The recent introduction of high speed tool steels such as carboloy steel has made it possible to greatly increase the maximum spindle speed of turning lathes and the like. In order to provide for running the lathe also at slow speeds to make the lathe suitable for different types of tools and for different kinds and sizes of material it is necessary to have a relatively wide range of spindle speeds. It is an object of the present invention to provide a simple and effective construction for securing this wide range of operating speeds. Another object is to so arrange the motor that it may drive the spindle directly for maximum speed, and through speed change gearing for slower speeds.

It is a further object of the invention to provide a lathe headstock which has the driving motor and the change speed gearing enclosed within the headstock housing and in which the parts are readily accessible.

Another object is to provide a novel power transmission means through which the motor can drive the spindle.

Other objects and advantages of the invention will be apparent from the following description, the appended claims and the accompanying drawing, in which—

Fig. 1 is a vertical central section of a headstock of a lathe embodying the present invention;

Fig. 2 is an end elevation of the headstock; and

Fig. 3 is a side elevation of a lathe showing the headstock at one end thereof.

It is generally desirable that the spindle in the headstock of a lathe be supported in bearings which are relatively widely spaced because the increased length in spacing of the bearings tends to hold the spindle in alignment with the lathe bed. In the headstock according to the present invention an elongated housing is provided with bearings at or adjacent its ends in which the spindle is journaled. The usual method of driving the spindle has been to use a motor placed on top of the housing which results in giving rather an ungainly appearance to the headstock and to the lathe as a whole. According to this invention the motor is mounted within the housing of the headstock and is coaxial with the spindle. In addition to presenting a neat appearing lathe this arrangement has several important mechanical advantages. In the first place the motor is arranged so that it can drive the spindle directly for maximum speed without the interposition of any gearing whatever, and it is of course obvious that unless the motor is made coaxial with the spindle there must be provided some power transmitting means to drive the spindle which usually would involve a set of gearing.

With the present arrangement the motor is adapted to drive the spindle directly without the usual noise, vibration and unequalities of a change of gearing. In the second place when the motor drives the spindle through gearing there is necessarily a bending moment applied to the spindle which might result in deflection. With the present invention however the driving torque is transmitted to the spindle equally around the circumference thereof without any resultant bending moment being applied to the spindle. Furthermore, in its preferred form, the motor itself is not mounted upon the spindle but the armature thereof is securely attached to a rotatable sleeve which is supported in the housing independently of the spindle and in spaced relationship thereto. This arrangement further relieves the spindle of any unbalanced torque and produces a substantial and sturdy construction which will not be affected to any great extent by long use. A speed change arrangement is also provided so that the lathe is adapted to be used in connection with different types and sizes of material and with different tools, and this speed change gearing is preferably included within the same housing which encloses the spindle and the motor. A novel construction of the housing itself is also provided by dividing the interior of the headstock into two sections in one of which is placed the change speed gearing, and in the other the motor. This provides a convenient means for preventing any dirt or grease which usually will be found in the gearing from getting into and damaging the windings of the motor. The change speed gearing is so mounted within the headstock as to be capable of easy removal and assembly therein.

Referring more particularly to the drawing by reference numerals, the main supporting frame of a turning lathe is designated 10, being provided at one end with a headstock designated generally 11. Within the headstock is a driving motor which operates the face plate 15 and spindle 16 directly or through suitable change speed gearing. The type of lathe shown is particularly adapted for turning metal.

The headstock embodies a housing or casing formed of a main housing member 12 providing an intermediate and lower housing part, an end housing member 13, and a top and forward housing member 14, which may be bolted together in any suitable manner and together completely enclose the motor and the gearing. The face plate 15 is mounted upon the spindle 16 which is supported at its forward end by roller bearings 17 which are carried in a bearing supporting member 18 which in turn is carried in an upstanding end wall of the housing member 12, as shown. The rear end of the spindle 16 is rotatably supported in ball bearings 20 which are carried in bearing support 21 mounted upon the rear or end housing member 13. Rear cover plate 22 and forward cover plate 23 enclose the bearings.

The intermediate housing member 12 is formed with a partition wall 25 which is adapted to support the roller bearings 27. These bearings form the forward support for a rotatable sleeve 30, which is journaled at its rearward end in roller bearings 31, the two bearings serving to rotatably support the sleeve in spaced relationship with the spindle. An intermediate bearing 34 between the sleeve and the spindle may also be provided to further strengthen and prevent deflection in the spindle. A slinger ring 28 is mounted upon the sleeve 30 to throw grease and dirt by centrifugal force against a collecting groove 29 in housing member 12. The sleeve 30 carries the armature 32 of the driving motor which may be either an alternating or a direct current motor adapted to have a relatively wide speed variation. While the control circuits for effecting variable speed operation have not been shown in the drawings it will be understood by those skilled in the art that any of the well known forms of speed control may be used. The control 70 for the motor may be conveniently placed on the traveling carriage so as to be within easy reach of the workman. The field poles 33 of the motor are fixedly mounted upon the housing member 12. The motor is thus adapted to rotate the sleeve from which the power is transmitted, as will be presently described, to the spindle 16.

The female portions 35 of a spline member is bolted or otherwise attached to the forward end of sleeve 30. The gear 36 is rotatably mounted upon bushings 37 upon the spindle 16 and adapted to slide along the spindle; this gear 36 is formed with a male spline member 38 which is adapted to engage the female portion 35 at all times and in addition is formed with a small pinion 40 at its forward end.

The gear 36 may be adjusted relatively to the spindle by a suitable gear shifting lever 39 projecting into a groove formed adjacent pinion 40. The operating handle of this lever extends through the housing so as to be conveniently under the control of the operator.

The housing member 14 is provided with a depending flange wall 42 at its rear end and an end wall 43 at its forward end, these walls forming the supports for the bearings of the countershaft 45 which is journaled in roller bearings 46 and 47. These bearings are positioned in eccentric bearing supports 48 and 49 respectively which in turn are rotatably fitted into the walls 42 and 43. The forward support 49 may be removed and is held in place by cap screws and a retaining ring 50 while the rear support 48 is removable by dropping the lower section of the flange wall 42.

The countershaft 45 is made with an internal bore and a shaft 64 extends therethrough, sufficient clearance being allowed so that it will not bear on or rub against the countershaft, and is keyed or pinned in the eccentric bearing supports 48 and 49 so as to interconnect the same. The support 49 extends through cover plate 65 and an operating lever 66 is mounted thereon. This lever may be rotated through an arc of approximately 180° and in so doing it causes rotation of shaft 64 and a turning of the eccentric bearing supports 48 and 49. This results in moving the countershaft with its gearing away from the spindle so that the gears may be moved from an operative position wherein they are adapted to mesh with the gears on the spindle to an inoperative position wherein they are no longer in mesh. By removing the bolts which attach the top housing member 14 to the remainder of the housing, the top section, together with the countershaft and all its gearing, may be bodily removed. This provides for easy assembly and disassembly.

A gear 51 is fixedly attached by means of a set screw, key or other means, to the countershaft 45 and is adapted for driving engagement with gear 36 in one position of the latter. A sliding gear 52 is rotatably mounted upon countershaft 45 and is carried thereon by a bushing 53. This gear is adapted to slide along the countershaft and is provided with a groove in which fit the prongs of a suitable gear shifting lever 54. This lever 54 also extends through the housing and is arranged within easy reach of the operator. Gear 52 is adapted to engage gear 40 and in addition is provided at its forward end with internal gear or clutch teeth 55. When gear 52 is moved into its forward position by the means described above, the teeth 55 are caused to engage the teeth of a pinion 56 which is integrally formed on the countershaft 45. The pinion 56 in turn meshes with a large gear 60 which is keyed or otherwise attached to spindle 16. Formed on the gear face of gear 60 are internal clutch teeth 62 which are engageable with the teeth of gear 40 in certain positions of the latter.

A suitable cover plate 65 is removably bolted or otherwise attached to housing member 14 so that access can readily be had to the forward bearing of the countershaft. By removing the cap screws and retaining ring 50 it will be apparent that the roller bearings 47 may be removed without difficulty and if it is desired to remove the whole countershaft it is only necessary to loosen gear 51 and slip the countershaft out, dropping gears 51 and 52.

With the gears in the position shown in Fig. 1, the motor is adapted to drive spindle 16 through the spline members 35 and 38, pinion 40, gear 52, internal clutch teeth 55, pinion 56 to gear 60, and thus the spindle 16 is driven at its lowest speed. If the gear shift levers are so operated as to move gear 52 to the rear so as to disengage the internal clutch teeth 55 from the pinion 56 and at the same time the spline gear 36 is moved to the rear to engage gear 51, the drive chain will be from spindle 30 through spline members 35, 38, gear 51 to countershaft 45, to pinion 56, and gear 60. This arrangement gives intermediate speed operation to the spindle. To obtain a direct drive, gear 52 is moved toward the rear to disengage internal clutch teeth 55 from pinion 56 and the spline gear 36 is moved to its extreme forward position so that the pinion 40 may engage internal clutch 62. In this case the armature of the motor and sleeve 30 drive directly through the spline members 35, 38, pinion 40 and internal clutch 62 to spindle 16. When it is desired to operate at high speeds with the direct drive for any extended period of time the hand lever 66 may be rotated through 180° from the position shown in which case the countershaft will be moved away from the spindle and the gears 40, 52 and 56, 60 will, respectively, be disengaged. This will eliminate all wear and tear, noise, vibration, and loss of energy in the gearing. It is also possible to operate with direct drive without rotation of the countershaft in its eccentric supports, in which case gear 52 and pinion 56 will remain in mesh with gears 40 and 60 respectively and will rotate idly.

As a specific example of one arrangement of a very satisfactory construction, a direct current motor is used having a speed range of from 200 to 800 R. P. M. Gear 36 is provided with fifty-eight teeth, pinion 40 with eighteen teeth, gear 51 with fifty-two teeth, gear 52 with sixty-four teeth, pinion 56 with fifteen teeth, and gear 60 with sixty-seven teeth. Thus for high speed operation it is possible to obtain any speed of the spindle from 200 to 800 R. P. M. in direct drive. With the gearing arranged for intermediate speed operation any speed from 50 to 200 R. P. M. may be obtained, and with the gearing arranged for slow speed operation it is possible to drive the spindle at any speed from 12½ R. P. M. to 50 R. P. M. Thus with but two changes in the driving chain it is possible to obtain spindle speeds ranging anywhere from 12½ to 800 R. P. M. This range of speeds is sufficiently wide to permit the handling of work adapted to be turned at very high speeds using a carboloy steel tool and at the same time to permit the working of larger and heavier materials with slower speed tools.

It will thus be apparent to those skilled in the art that the present invention provides a headstock embodying several novel and useful features. It provides for driving the spindle directly from the motor at high speeds and at the same time provides a neat and compact speed change gearing arrangement for adapting the lathe for operation at slower speeds. Furthermore, a sturdy and rigid construction has been provided for the spindle, and the weight of the motor and any bending moment has been removed from the spindle so as to relieve the strain from the bearing and consequently to prolong their life and to increase the accuracy of the lathe. This new headstock presents a pleasing appearance and completely encloses the driving mechanism of the spindle including the motor itself. The headstock is relatively small and compact and can be readily dismantled and access easily had to the gearing compartment and to the motor. The distinct separation of the interior of the headstock into two compartments provides for the segregation of motor and change speed gearing so that the latter may be lubricated without danger of any injury resulting to the windings of the motor.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A headstock for a lathe comprising a spindle, a sleeve rotatably supported in spaced relation to said spindle and provided with a spline member, a motor for driving said sleeve, a gear rotatably and slidably mounted on said spindle and provided with a cooperating spline member, and means establishing a direct driving connection from said motor to said spindle, comprising an additional gear fixed on said spindle and provided with clutch teeth adapted to engage the teeth of said first mentioned gear in one position of the latter.

2. A headstock for a lathe comprising a spindle, a sleeve rotatably supported in spaced relation to said spindle and provided with a splined member, a member for driving said sleeve, a gear slidably mounted on said spindle and provided with a cooperating splined member, a second gear fixed to said spindle and provided with clutch teeth adapted to engage the teeth of said first gear, a countershaft, a pinion fixed to said countershaft and meshing with said second gear, a third gear slidably mounted on said countershaft and meshing with said first gear, and being also provided with clutch teeth adapted to engage the teeth of said pinion when moved to a predetermined position, to thereby establish a driving connection from said motor to said spindle.

3. A headstock for a lathe comprising a sectional housing including detachably connected main and top housing members together enclosing a single gear chamber, a spindle journaled in said housing, and a countershaft journaled in bearings carried by said top housing member and removable therewith to provide for ready access to substantially the entire gear chamber.

4. In a lathe of the character described, a main supporting frame, a headstock comprising an enclosing housing having its base supported on said frame, bearings supported by said housing adjacent the ends thereof, a spindle journalled in said bearings, motor rotor and stator members enclosed in said housing and surrounding a portion of said spindle, a sleeve surrounding said spindle and providing a rotatable support for said rotor member, means for rotatably supporting said sleeve in said housing independently of said spindle, and a driving connection between said rotor and said spindle.

5. In a lathe of the character described, a main supporting frame, a headstock comprising a sectional housing having its base supported from said frame, bearings positioned in said housing, a spindle journalled in said bearings, a motor within said housing, having its axis in alignment with said spindle, change speed gearing in said housing including a countershaft, and means for journaling said countershaft in a separate removable housing section to provide for ready access to the interior of said headstock.

6. A headstock for a lathe including a main supporting frame, a sectional housing having detachably connected main and top housing members, said main housing member being mounted on said frame, a spindle journalled in said housing, and a countershaft journalled in said top housing member and removable therewith to provide ready access to said spindle.

7. A headstock for a lathe including a sectional housing having detachably connected main and top housing members, a spindle journalled in said housing, a motor within the housing for driving the spindle, and a countershaft and change speed gearing carried by said top housing member and removable therewith to provide access to the interior of said housing without disturbing the operative assembly of said motor and said spindle.

8. In a lathe, a main supporting bed frame, a headstock comprising a housing having its base supported on said frame, a spindle rotatably supported in said housing, motor field coils fixed in said housing, a motor armature rotatably supported by said housing in alignment with the spindle, change speed gearing within said housing, and driving connections between said motor armature and said spindle providing for a direct drive and for selectively including the change speed gearing.

9. In a lathe, a main supporting bed frame, a headstock comprising a symmetrical housing having its base supported on said frame, a spindle rotatably supported in said housing substantially below the center thereof, a motor within said housing in alignment with the spindle, a countershaft supported in said housing above said spindle and above the center of said housing, change speed gearing carried by said countershaft providing a driving connection from the motor to the spindle, means establishing a direct driving connection from said motor to said spindle, and an eccentric mounting for said countershaft to provide for disengagement of said change speed gearing when said direct driving connection is established.

LYNDON C. COLE.